(12) United States Patent
Regan

(10) Patent No.: US 7,298,542 B2
(45) Date of Patent: *Nov. 20, 2007

(54) MICROELECTROMECHANICAL DEVICE WITH RESET ELECTRODE

(75) Inventor: Michael J. Regan, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/448,489

(22) Filed: Jun. 7, 2006

(65) Prior Publication Data

US 2006/0227405 A1    Oct. 12, 2006

Related U.S. Application Data

(62) Division of application No. 10/817,028, filed on Apr. 2, 2004, now Pat. No. 7,095,545.

(51) Int. Cl.
*G02B 26/00* (2006.01)

(52) U.S. Cl. .............. 359/290; 359/291; 359/292; 359/295; 359/298; 359/223; 359/224

(58) Field of Classification Search ........ 359/290–292, 359/295, 298, 223, 224
See application file for complete search history.

(56) References Cited

U.S. PATENT DOCUMENTS

| | | | |
|---|---|---|---|
| 4,662,746 A | 5/1987 | Hornbeck | |
| 5,083,857 A | 1/1992 | Hornbeck | |
| 5,202,785 A | 4/1993 | Nelson | |
| 5,835,256 A | 11/1998 | Huibers | |
| 6,046,840 A | 4/2000 | Huibers | |
| 6,271,955 B1 | 8/2001 | Atobe et al. | |
| 6,404,534 B1 | 6/2002 | Chin et al. | |
| 6,522,454 B2 | 2/2003 | Meier et al. | |
| 6,529,310 B1 | 3/2003 | Huibers et al. | |
| 7,023,603 B2 * | 4/2006 | Reboa | 359/290 |
| 2002/0051053 A1 | 5/2002 | Kawai | |
| 2002/0101644 A1 | 8/2002 | Mei et al. | |
| 2002/0176150 A1 | 11/2002 | Huibers | |
| 2003/0202265 A1 | 10/2003 | Reboa et al. | |
| 2003/0210453 A1 * | 11/2003 | Noda | 359/290 |
| 2005/0152017 A1 * | 7/2005 | Reboa | 359/290 |

OTHER PUBLICATIONS

Wikipedia.org (Internet Website) definition for "Dielectrophoresis."*

* cited by examiner

*Primary Examiner*—Evelyn A. Lester

(57) ABSTRACT

A microelectromechanical device having a reset electrode for use in various devices including display devices such as those employing spatial light modulators. The device includes an optically transmissive substrate, a semiconductor substrate, and a member deflectable between a rest position and an operative position supported by one of the substrates. The deflectable member returns to an undeflected position by operation of the reset electrode.

8 Claims, 10 Drawing Sheets

US 7,298,542 B2

MICROELECTROMECHANICAL DEVICE WITH RESET ELECTRODE

CROSS REFERENCE TO RELATED APPLICATIONS

This application is a divisional of U.S. application Ser. No. 10/817,028, filed Apr. 2, 2004, now U.S. Pat. No. 7,095,545.

BACKGROUND

The present invention relates to projection systems having micromirrors and micromirror arrays. The present invention also relates to integrated circuits having at least one deflectable element.

Various technologies have been proposed for projection and display systems such as those utilizing spatial light modulation employing various materials. Among these are silicon-based micromechanical spatial light modulation (SLM) devices in which a large portion of the device is optically active. In such systems, micromirrors may deflect in one or more directions. For instance, in architectures that rely on a passive drive scheme, a voltage bias is accomplished by an address electrode. Once the mirror rotates, the electrode floats and the mirror maintains its deflected position. As the bias is reset, the mirror rotates back to the flat state at a rate that is limited by the hinge spring constant of the micromirror device. The hinge spring constant typically results in a reset cycle that is slower than the drive cycle. This limits the ability of the micromirror device to twitch at high frequencies. Thus, it would be desirable to provide a micromirror architecture that could facilitate high reset frequencies, while providing high efficiency and operational integrity.

SUMMARY

Disclosed herein is a microelectromechanical device having a reset electrode suitable for use in projection display devices such as spatial light modulators. The device includes an optically transmissive substrate, a semiconductor substrate positioned a spaced distance from the optically transmissive substrate, and a member positioned between the optically transmissive substrate and the semiconductor substrate deflectable between a rest position and at least one operative position. The deflectable member is supported by one of the optically transmissive substrate or the semiconductor substrate. The deflectable member deflects when electrostatically attracted to at least one address electrode and returns to an undeflected position by operation of a reset electrode.

DETAILED DESCRIPTION

The present disclosure is directed to display devices, particularly those utilizing spatial light modulators. The present disclosure is also directed to microelectromechanical devices that include a member deflectable between a rest position and at least one operative position. The deflectable member can be made of various reflective media in order to redirect light from one light path to another. Reflective deflectable members are typically referred to as micromirrors.

Deflection is typically accomplished by electrostatic force generated by at least one address electrode at a given bias voltage. In the device disclosed herein, the deflectable member is returned to an undeflected position by operation of a reset electrode operating independent of the CMOS architecture. The bias voltage produced by the reset electrode is sufficient to redirect the deflectable member. In certain instances the bias voltage produced by the reset electrode may be greater than the bias voltage exerted by the address electrode. Thus, the electrostatic force generated by reset electrode can quickly and efficiently return the deflectable member to a rest position.

Figure 1A:
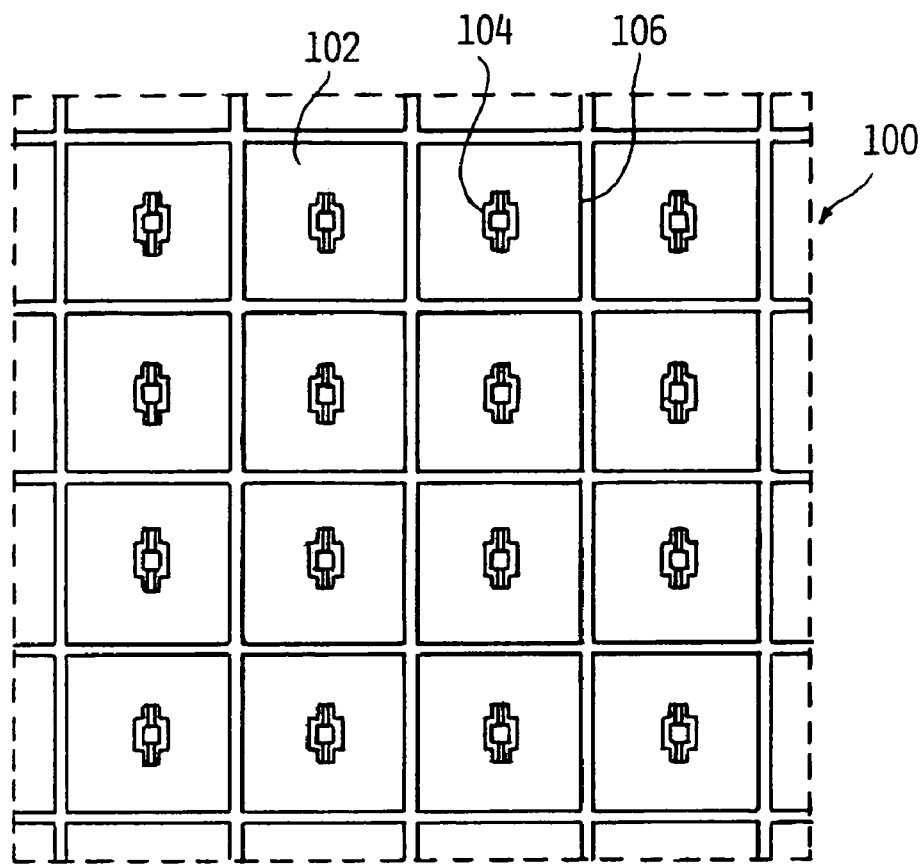
FIG. 1A is a plan view of an embodiment of a digital light modulator including an array of micromirrors.
Figure 1B:
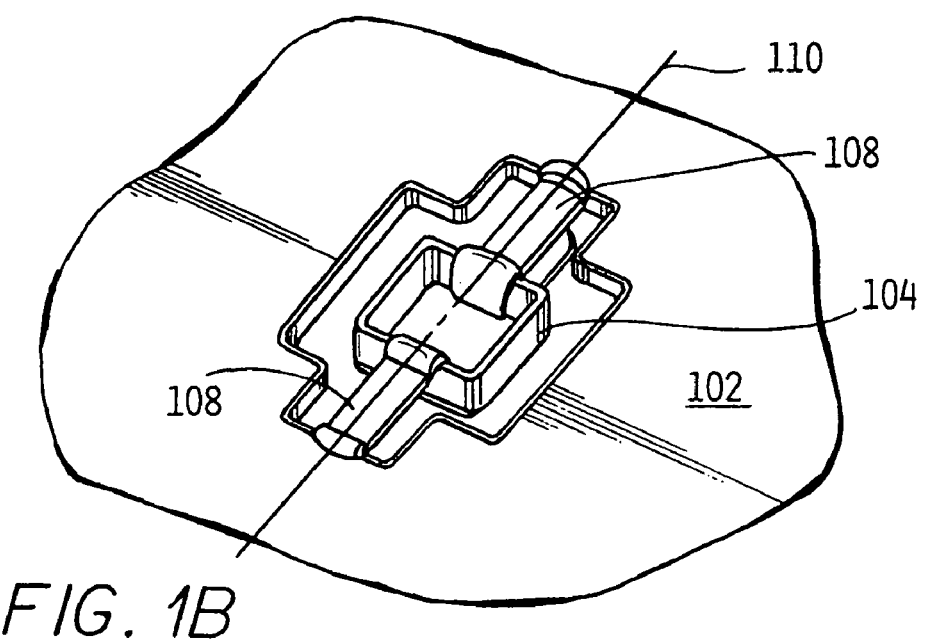
FIG. 1B is a detail view of one hinge configuration suitable for use with micromirrors.
Figure 1C:
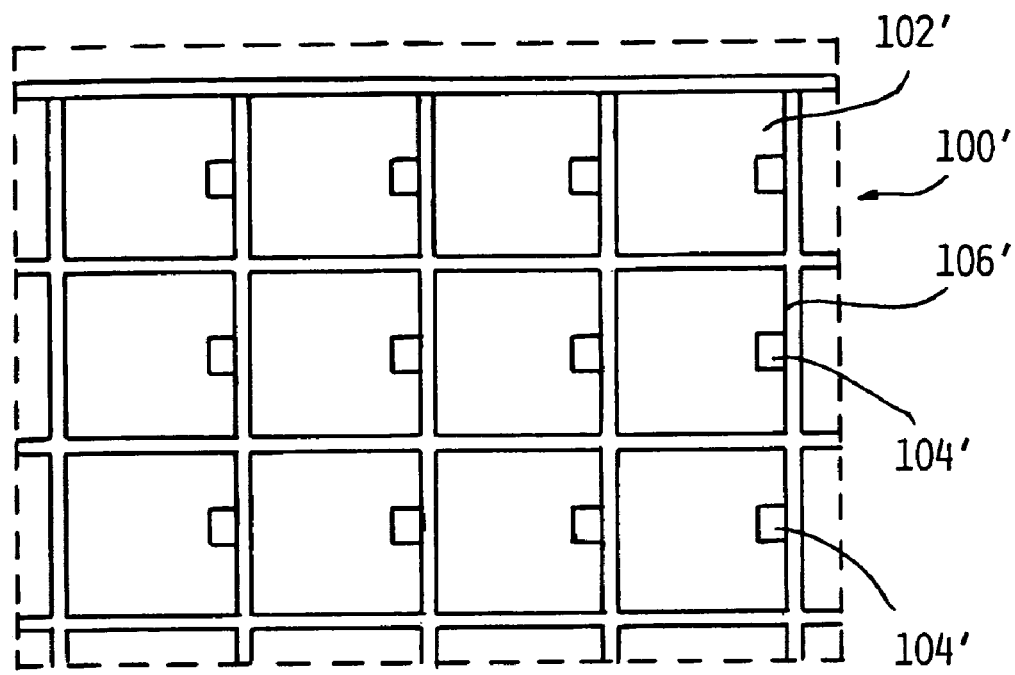
FIG. 1C is a plan view of an embodiment of a digital light modulator including an array of micromirrors having side hinge configuration.

It is contemplated that the microelectromechanical device may include any suitable deflectable member requiring rapid reset. For purposes of illustration the device will be described in terms of a digital micromirror device. However, other microelectromechanical devices and configurations may be effectively utilized within the scope and spirit of this disclosure. Digital micromirror devices that would be suitable for use with the rapid reset configuration as described herein are described in co-pending application Ser. No. 10/136,719 entitled "Micro-mirror Device", filed Apr. 30, 2002, and commonly assigned to the entity herein, the specification of which is incorporated by reference herein. As generally discussed herein, the digital micromirror device may have various planar geometries as desired and/or required. It is contemplated that the digital micromirror device may include various hinge architectures including hidden hinge, exposed hinge, and flat mirror architectures. For purposes of illustration, various hidden and exposed hinge architectures are contemplated, depicted, and discussed. It is to be understood that the reset device disclosed herein may be employed with various single deck and double deck hinge assemblies. FIG. 1A shows a plan view of a portion of a digital micromirror array 100 according to a first embodiment of the present invention. FIG. 1B shows a detail view of a representative hinge construction. FIG. 1C shows a plan view of a side hinge digital micromirror array 100'. Each element in the array can include a mirror element 102, (102' in device array 100').

As seen in FIGS. 1A, 1B, and 1C, each mirror element 102, 102' is supported by a support post 104, 104'. The support post 104, 104' may be positioned as desired or required to facilitate operation. As depicted in FIG. 1A, the support post 104 may be centrally positioned relative to mirror element 102. It is also contemplated that the support post 104' can be positioned proximate to a suitable edge 106' of the mirror element 102' as depicted in FIG. 1C. The mirror elements 102, 102' are depicted as square members in FIGS. 1A and 1C. However, it is contemplated that the mirror elements 102, 102' may have any suitable geometry or configuration.

Posts such as support post 104, 104' are connected to the mirror element 102, 102' via appropriate hinge members such as hinges 108 as illustrated in FIG. 1B. Hinges 108 are constructed and configured to permit torsional rotation about a hinge axis 110. In this manner, movement of the mirror element 102, 102' relative to post 104, 104' is accomplished.

Figure 2:
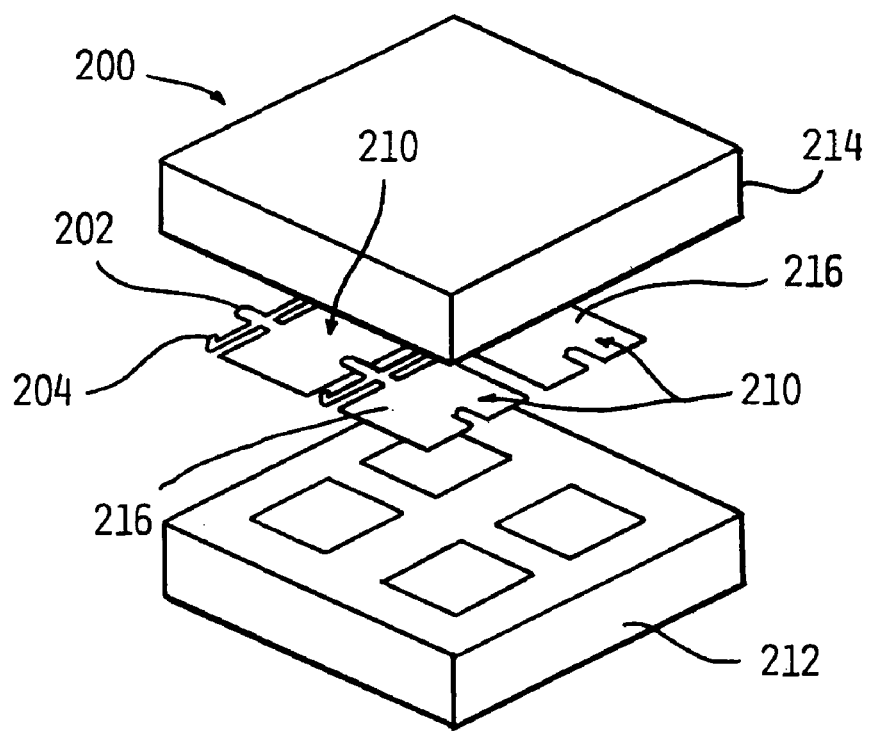
FIG. 2 is a perspective view of an embodiment of a micromirror device having a side hinge configuration.
Figure 3:
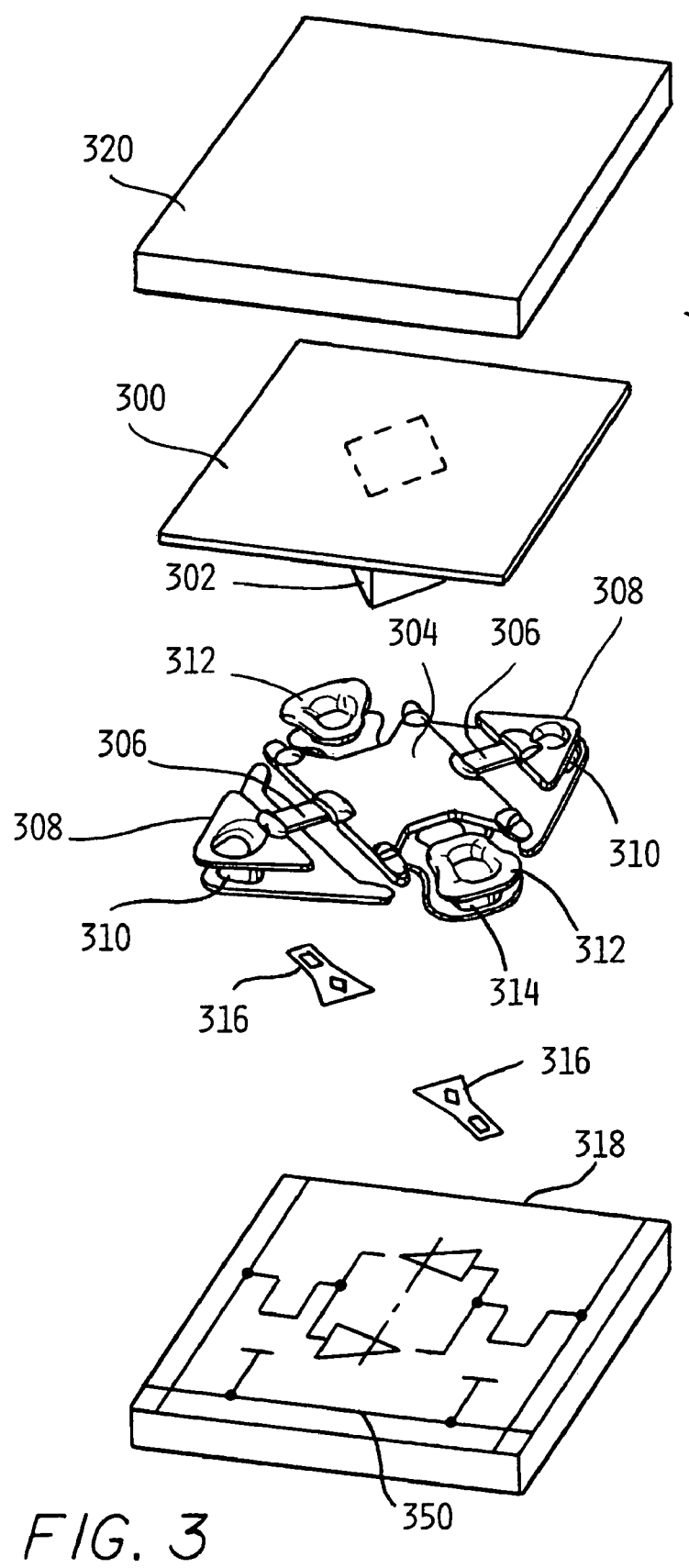
FIG. 3 is an exploded view of an embodiment of a digital micromirror pixel.

The deflectable member is supported on at least one of the optically transmissive/transparent substrate/layer or the semiconductor substrate as desired or required. One nonlimiting illustration of an embodiment of a deflectable member(s) such as a digital micromirror mounted to the optically transmissive substrate is depicted in FIG. 2. A nonlimiting illustration of an additional embodiment of a deflectable member(s) such as digital micromirror devices mounted to the semiconductor surface is illustrated in FIG. 3. For purposes of this discussion, the deflectable member is a portion of a micromirror display device. However, it is to be understood that the deflectable member may be one that is utilized in other devices and electronic architectures for other purposes. In an embodiment, the deflectable member is a rigid reflective plate.

FIG. 2 depicts an exploded view of a spatial light modulator 200 having pixel cells of any configuration or array size. For clarity, only four pixel cells in a 2×2 grid configuration are shown. Each pixel cell has a suitable pixel pitch as desired or required. The device includes a suitable semiconductor substrate 212, an overlying optically transmissive substrate 214, and at least one deflectable member 210 (e.g. reflective member) positioned between the semiconductor substrate 212 and the optically transmissive substrate 214.

The deflectable member 210 is composed of a mirror 216 mounted to a suitable hinge 202 that is connected to a suitable support post 204.

Throughout this description, the words "optical" and "light" are used. In the description and in the claims, "optical" means related to any electromagnetic frequency, not just frequencies in the visible range. Similarly, light includes light in visible and nonvisible spectra. For instance, an "optically transmissive substrate" is a substrate which is transmissive to electromagnetic propagation of a working frequency, whether in the visible range or not.

For purposes of illustration, a representative hidden hinge micromirror device pixel is depicted in FIG. 3. As seen in FIG. 3, mirror 300 is supported by a support post 302, which is supported on landing yoke 304. Landing yoke 304 is attached to one end of each of the torsion hinges 306. The other end of each torsion hinge 306 is attached to a hinge support post cap 308 on top of the hinge support post 310. Address electrodes 312 are supported by the address support posts 314. Address support posts 314 and hinge support posts 310 support the address electrodes 312, torsion hinges 306, and the landing yoke 304 away from the address electrode pads 316. Underlying the yoke 304 and the address electrode pads 316 is a suitable semiconductor substrate 318 containing suitable CMOS and memory as desired or required. As depicted in FIG. 3, the pixel also includes a suitable optically transmissive substrate 320 in overlying relationship to the mirror 300.

It is contemplated that the pixel and associated device, such as a spatial light modulator, may further comprise a voltage controller operable on the address and reset electrodes to actuate deflection and reset the deflectable member. The voltage controller designed in the silicon substrate can be a suitable SRAM, DRAM, or other type of low voltage high speed logic. A voltage control circuit is defined in FIG. 3 at reference numeral 350 for purposes of discussion and illustration. It is also contemplated that a voltage controller connected to the reset electrode and connected to the mirror offset bias is typically accomplished as off-chip electronics to obtain higher voltage potentials.

In the various embodiments and configurations such as those illustrated in FIGS. 2 and 3, it is contemplated that the optically transmissive layer may be held in registration with the substrate by any suitable method. Among these are included traditional registration methods and architectures as well as methods which accomplish extremely close registration such as silicon/glass bonding techniques. Such silicon/glass bonding techniques include methods whereby an optically transmissive material such as glass can be bonded to a semiconductor substrate material such as silicon to achieve an integrated silicon/glass architecture.

Figure 4A:
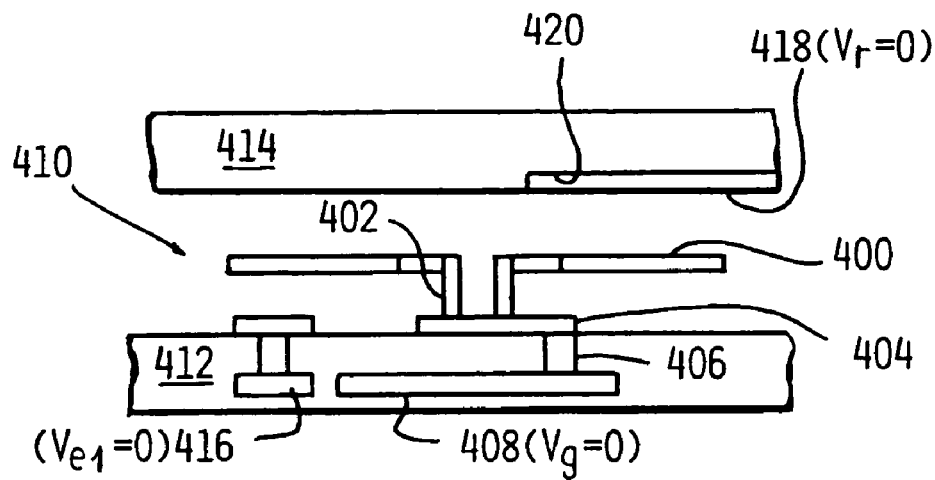
FIG. 4A is a cross-sectional view of one micromirror of a digital micromirror array in a rest position taken at 90° to the hinge axis.
Figure 4B:
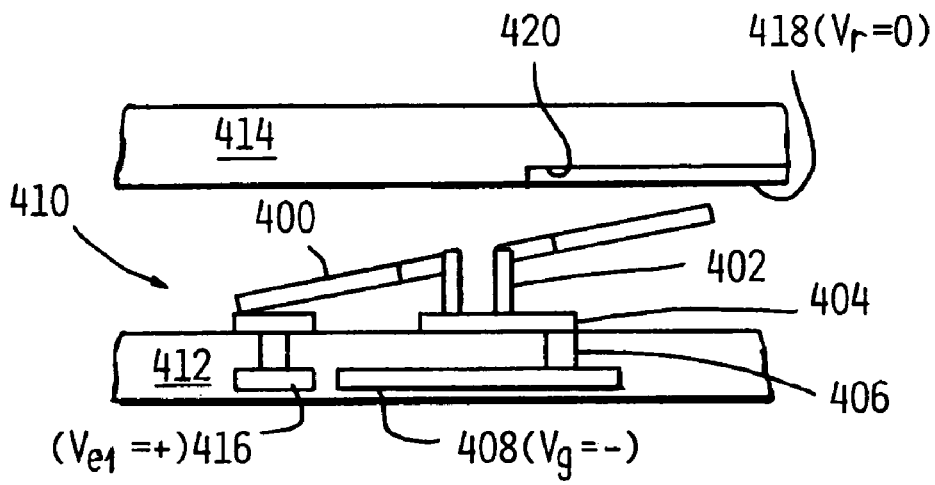
FIG. 4B is the digital micromirror of FIG. 4A driven to a deflected or operative position.
Figure 4C:
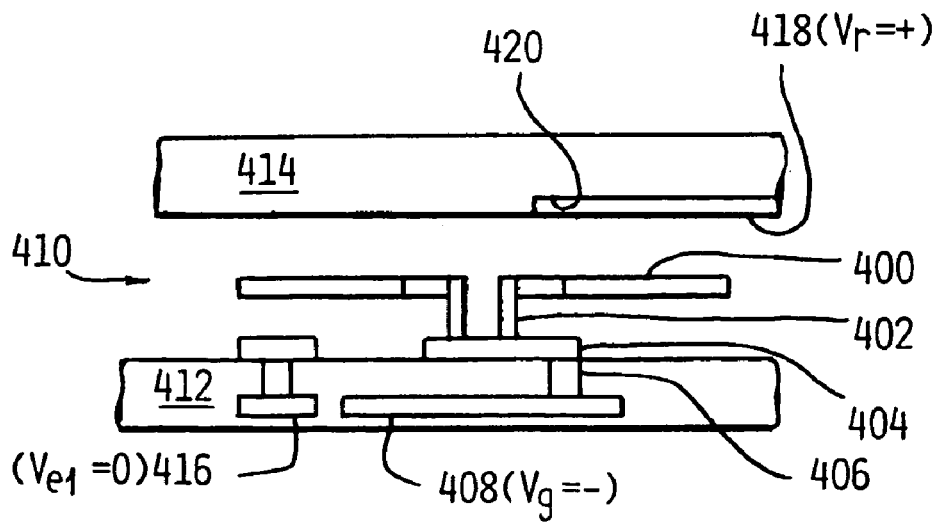
FIG. 4C is the digital micromirror of FIG. 4A in reset mode.

FIGS. 4A, 4B, and 4C depict one element of a micromirror array as depicted in FIG. 1A. The micromirror element is depicted in cross-section at 90° to the hinge axis. Mirror 400 is attached to support post 402 by means of suitable torsion hinges (not shown). Support post 402 is in electrical communication with ground source 408 via upright 406 and lower support 404. Taken together, mirror 400 and accompanying support post 402, upright 406, lower support 404 and hinge(s) (not shown), comprise a deflectable member assembly 410 that is positioned between a semiconductor substrate 412 and an optically transmissive substrate 414. The deflectable member assembly 410 permits movement of a deflectable member, in this case micromirror 400 between a rest position as depicted in FIG. 4A and at least one operative position, such as that depicted in FIG. 4B.

It is contemplated that the deflectable member such as micromirror 400 is supported by one of the optically transmissive substrate 414 or the semiconductor substrate 412. "Support" and/or "support structure" as used throughout the specification is defined as suitable attachment to one of the appropriate substrates 412, 414 sufficient to permit or facilitate deflectable movement as between a rest or optically neutral position and at least one operative position, as illustrated in the drawing figures. As depicted in FIGS. 4A, 4B, and 4C, the deflectable member assembly 410 is supported on the substrate 412. The deflectable member assembly 410 is operable to deflect a deflectable member such as mirror 400 from the rest position to at least one deflected position in response to an electrostatic attractive force generated by address electrode 416. The deflectable member returns to an undeflected position when subjected to a suitable electrostatic force generated by a reset electrode 418.

As depicted in FIGS. 4A, 4B, and 4C, the address electrode 416 is positioned in the substrate 412 and is integrated as a part of the CMOS architecture. The reset electrode 418 is positioned on or integrated into the optically transmissive substrate 414. The reset electrode 418 can be configured in any suitable manner. When positioned on the optically transmissive substrate 414, the reset electrode 418 may be composed of an optically transparent conductive material.

Suitable optically transparent conductive materials are those which will permit device function with minimal interference or degradation. Typically, optically transparent conductive materials will be those that have an index of refraction between about 1.0 and about 3.0 and exhibit a conductivity sufficient to permit and support the bias voltage desired. Exemplary conductivities would be between about $10^6$ 1/(ohm·cm) and $10^3$ 1/(ohm·cm). While the optical characteristics of the transparent conductive material may vary from application to application, suitable transparent conductive materials will typically exhibit a transmission greater than about 70 percent at a material thickness of 200 angstroms. Nonlimiting examples of suitable transparent conductive materials include various oxide materials composed of at least one Group III element and tin. Examples of suitable Group III elements include at least one of indium, gallium, and thallium. Examples of transparent conductive materials include at least one of zinc oxide, $In_2O_3$, indium tin oxide (ITO), $CdSnO_4$, $SnO$ and $SnO_2$.

The optically transparent reset electrode 418 may be located at any suitable position on the optically transmissive substrate 414. The reset electrode 418 can be configured in any suitable manner appropriate to facilitate function. As depicted in FIGS. 4A, 4B, and 4C, the optically transparent reset electrode 418 is located on the lower face 420 of the optically transmissive substrate 414. It is to be understood that the optically transmissive substrate 414 also has an upper face that is distal the semiconductor substrate 412. The reset electrode 418 may be connected to the lower face 420 of the optically transmissive substrate 414 in any suitable manner. As depicted in FIG. 4A, electrode thickness is exaggerated for purposes of illustration. As depicted, optically transparent reset electrode 418 is integrated into the optically transmissive substrate 414. It is also contemplated that the optically transparent reset electrode 418 may be in overlying relationship with the lower face 420 of the optically transmissive substrate 414. The reset electrode 418 is connected to a suitable power source (not shown) independent of the CMOS architecture and voltage limitations. As depicted, the address electrode 416 is integrated into the CMOS architecture.

It is contemplated that address electrode 416, ground electrode 408, and reset electrode 418 may have suitable voltage potentials as desired or required as defined by the requirements of the specific architecture and application. Depending upon design constraints, it is contemplated that voltage potential of the reset electrode 418 may be in a range broadly defined between −100V to 100V, or potential voltage in a range defined by CMOS architecture. The potential voltage for the address electrode 416 and ground electrode 408 will typically be constrained if integrated into the CMOS architecture, but will be sufficient to permit mirror 400 deflection. It is contemplated that the reset electrode 418 and ground electrode 408 will have a voltage potential sufficient to overcome the voltage potential of the address electrode 416.

In the rest or optically neutral position as depicted in FIG. 4A, the ground electrode 408, address electrode 416 and reset electrode 418 exhibit voltage potentials that permit the mirror 400 to remain at rest. By way of example, the voltage potentials for ground electrode 408 ($V_g$), address electrode ($V_{e1}$) and reset electrode ($V_r$) all equal zero.

In order to tilt the mirror 400 into the operative position depicted in FIG. 4B, a bias voltage is applied to address electrode 416 ($V_{e1}=+$). The applied bias voltage is one sufficient to produce an electrostatic attractive force to deflect the deflectable member 410. During deflection, it is contemplated that the voltage potential for reset electrode 418 and ground electrode 408 can remain neutral. Alternately, the reset electrode 418 and/or ground electrode 408 can be biased to facilitate deflection. For example, if desired, the electrostatic attractive force of the deflectable member assembly 410 may be enhanced by suitable bias to the ground electrode 408 ($V_g=-$) as shown in FIG. 4B.

In order to reset to the optically neutral position as depicted in FIG. 4C, a positive voltage may be introduced through the reset electrode 418 ($V_r=+$), which counters the negative potential bias voltage through the ground electrode 408. The voltage introduced through the address electrode 416 may be reduced to zero ($V_{e1}=0$), thereby producing a repulsive electrostatic force which drives the deflectable member 410 to the rest or optically neutral position.

It is contemplated that a block reset can be applied to an entire array of micromirror devices to provide a powerful electrostatic force to drive the deflected mirrors to their respective flat states.

Figure 5A:
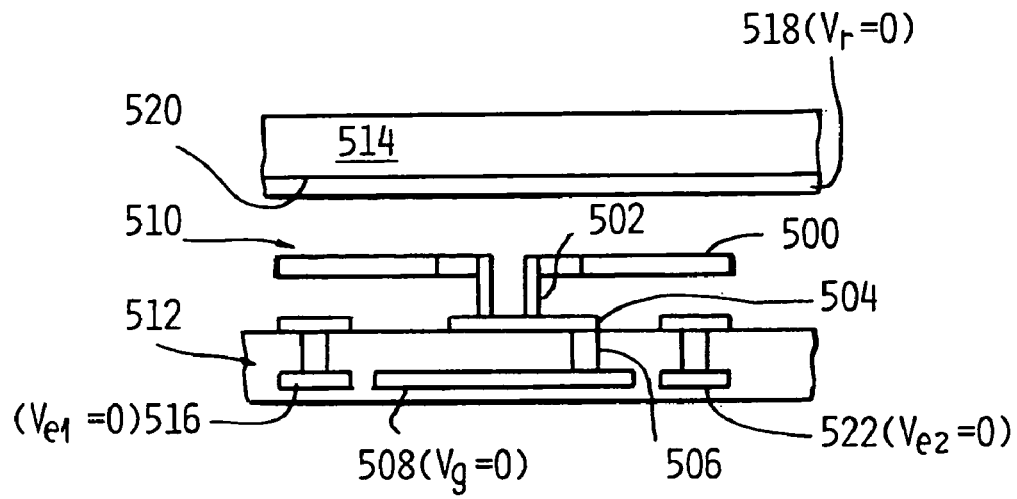
FIG. 5A is a cross-sectional view of one micromirror in a second embodiment of a micromirror array in the rest position taken at 90° to the hinge axis.
Figure 5B:
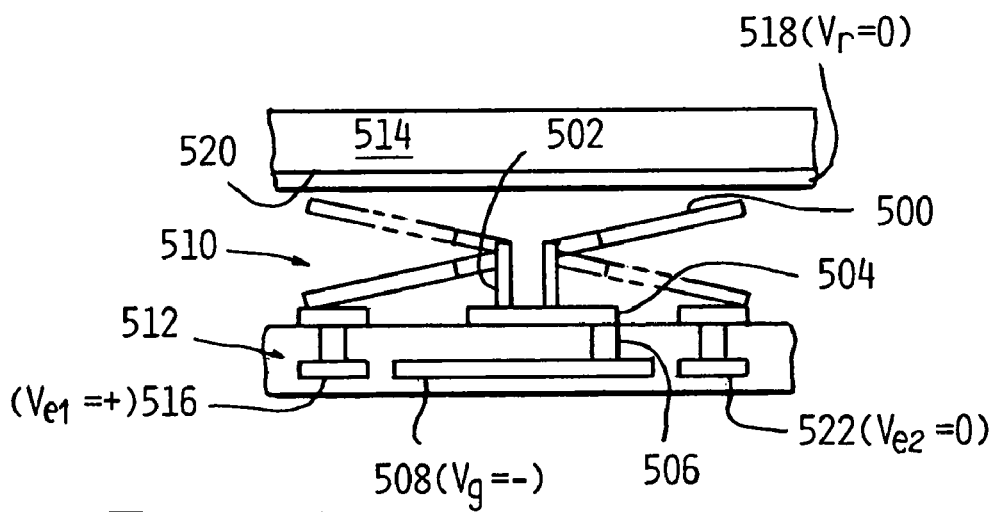
FIG. 5B is the digital micromirror of FIG. 5A driven to a deflected or operative position.
Figure 5C:
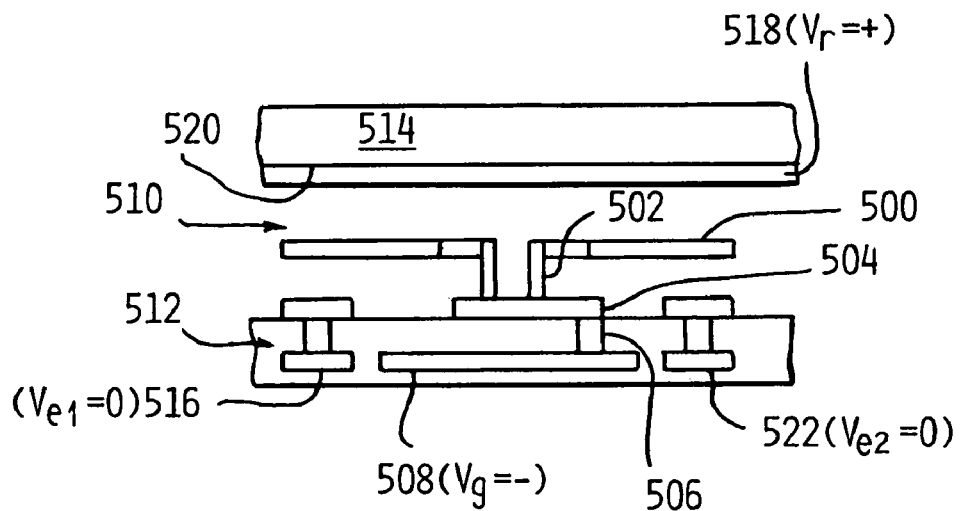
FIG. 5C is the digital micromirror of FIG. 5A in reset mode.

Turning now to FIGS. 5A, 5B, and 5C, a second embodiment of the micromirror architecture has been depicted in which the deflectable member assembly 510 includes mirror 500, support post 502, lower support 504, and upright 506 in contact with ground electrode 508. A reset electrode 518 is supported on a lower face 520 optically transmissive substrate 514. Address electrodes 516 and 522 are positioned in the semiconductor substrate 512 and are integrated into the CMOS architecture. The presence of multiple electrodes such as address electrodes 516 and 522 increases the angular range of the system. In the illustrated configuration, the mirror 500 may be driven from the optically neutral position depicted in FIG. 5A to one of two operative positions (the one operative position as depicted in solid line in FIG. 5B and an opposite operative position as depicted in phantom in FIG. 5B). Electrostatic force is exerted by the respective address electrode 516, 522 to drive the mirror 500 into the operative position. Return to the optically neutral position is facilitated by reset electrode 518. In the embodiment depicted in FIG. 5B, address electrodes 516 and 522 are controlled through CMOS circuitry resident in the semiconductor substrate 512. Reset electrode 518 and ground electrode 508 may be controlled outside of the CMOS circuitry by a suitable controller (not shown). In an embodiment, the ground electrode 508 is attached to the reflective element (e.g. mirror 500) and electrically coupled to the substrate 512, such that the ground electrode 508 is configured for selective actuation of the electronic circuitry. Alternatively, reset electrode 518 may be controlled on the CMOS. In order to reset the mirror 500 to the rest or optically neutral position, an electrostatic repulsive force is generated through reset electrode 518. The repulsive force is one sufficient to overcome any force generated by the address electrode 516, 522.

In the rest or optically neutral position as depicted in FIG. 5A, voltage potentials for ground electrode 508, address electrodes 516, 522, and reset electrode 518 are sufficient to permit mirror 500 to remain at rest. By way of example, the voltage potentials for ground electrode 508 ($V_g$), address electrodes 516, 522 ($V_{e1}$ and $V_{e2}$), and reset electrode 518 ($V_r$) all equal zero.

In order to tilt mirror 500 into a first operational position as depicted in FIG. 5B, a bias voltage is applied to address electrode 516 or 522 ($V_{e1}$=+). The applied bias voltage is one sufficient to produce an electrostatic attractive force sufficient to deflect the deflectable member assembly 510 and associated mirror 500. During deflection, it is contemplated that the reset electrode 518 and/or ground electrode 508 can be biased to facilitate deflection. For example, if desired, the electrostatic attractive force of the deflectable member assembly 510 may be enhanced by a suitable bias voltage at ground electrode 508 ($V_g$=-).

In order to reset to the optically neutral position as depicted in FIG. 5C, a positive voltage can be introduced through the reset electrode 518 ($V_r$=+), to counter negative potential bias voltage through ground electrode 508 ($V_g$=-). The bias voltage introduced through address electrode 516, 522 may be reduced to zero ($V_{e1}$=0) and the deflectable member assembly 510 may be drawn to the optically neutral position.

Use of a reset electrode 518 independent of the CMOS architecture permits high voltage reset procedures. As used herein, the term "high voltage" is broadly defined as voltages in excess of those that can be achieved through CMOS architecture. It is contemplated that high voltages can be as high as ±100 V or other values appropriate for the circuitry and configuration.

A third embodiment utilizing high voltage reset is depicted in FIGS. 6A, 6B, 6C, and 6D. Deflectable member assembly 610 includes mirror 600, support post 602, lower support 604, upright 606, and ground electrode 608. Deflectable member assembly 610 is supported by semiconductor substrate 612. An address electrode 616 is also supported by semiconductor substrate 612. Optically transmissive substrate 614 is in spaced overlying relationship with the deflectable member assembly 610. Reset electrode 618 is supported by semiconductor substrate 612 in a manner such that ground electrode 608 ($V_g$) and reset electrode 618 are not limited to CMOS voltage constraints but rather are a part general offset voltage introduced to an entire array of micromirrors or other deflectable members. Thus, the voltage applied between ground electrode 608 ($V_g$) and reset electrode 618 ($V_r$) may be sufficiently high to enable a high speed mirror reset. It is contemplated that voltages may be as high as ±100V or other values appropriate for the circuitry and configuration.

Figure 6A:
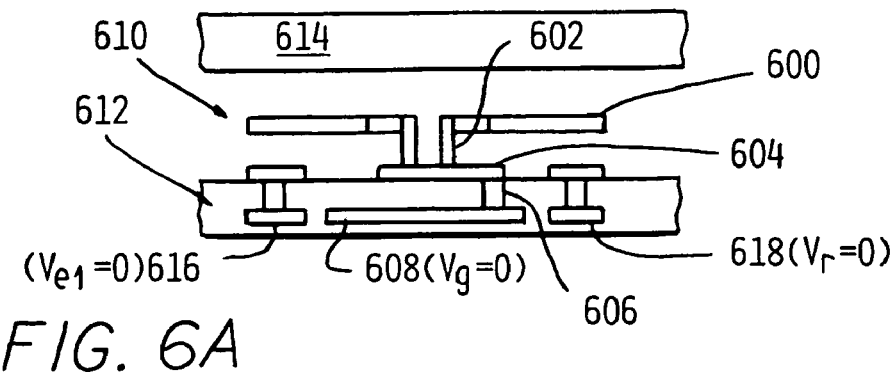
FIG. 6A is a cross-sectional view of one micromirror in a third embodiment of a micromirror array in the rest position taken at 90° to the hinge axis.
Figure 6B:
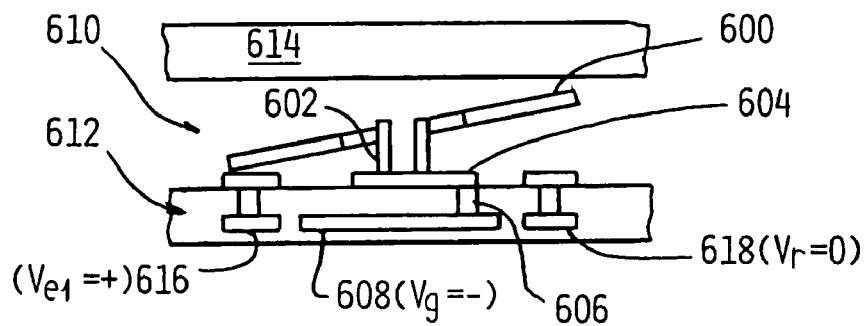
FIG. 6B is the digital micromirror of FIG. 6A driven to a deflected or operative position.
Figure 6C:
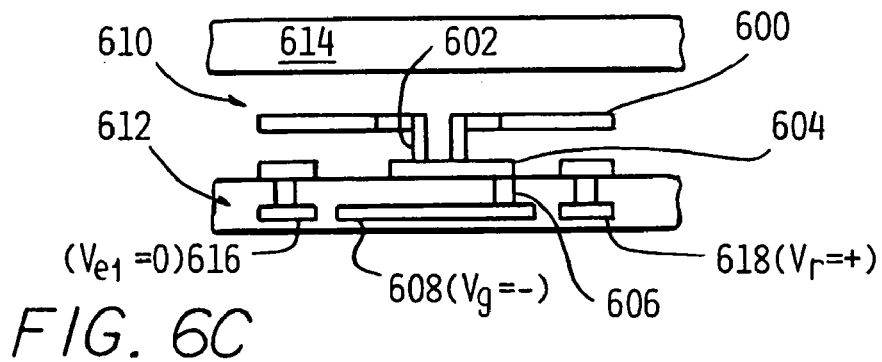
FIG. 6C is the digital micromirror of FIG. 6A depicting high voltage electrode reset.

In a representative operational sequence as depicted in FIGS. 6A, 6B, and 6C, initial voltage potentials for ground electrode 608, address electrode 616, and reset electrode 618 are those sufficient to maintain the mirror 600 in the rest or optically neutral position. As illustrated in FIG. 6A, voltage potentials for ground electrode 608 ($V_g$) address electrode 616 ($V_{e1}$) and reset electrode 618 ($V_r$) are all zero.

In order to tilt the mirror 600 to an operative position as depicted in FIG. 6B, a bias voltage is applied to address electrode 616 ($V_{e1}$=+). During deflection it is contemplated that the voltage of the ground electrode 608 and reset electrode 618 may be biased to facilitate deflection to the operative position if desired or required. If desired, the electrostatic attractive force of the deflectable member assembly 610 may be enhanced by a suitable bias voltage through ground electrode 608 ($V_g$=-).

In order to reset the mirror 600 to the optically neutral position as depicted in FIG. 6C, the bias voltage to address electrode 616 may be discontinued ($V_{e1}$=0) and a bias voltage may be applied to the reset electrode 618 ($V_r$=+), while the bias voltage applied to the ground electrode 608 remains negative ($V_g$=-). This negative bias voltage applied to the ground electrode 608 enhances electrostatic force of the deflectable member assembly 610. It is also contemplated that, in certain situations, the bias voltage applied to the ground electrode 608 may be neutral.

Figure 6D:
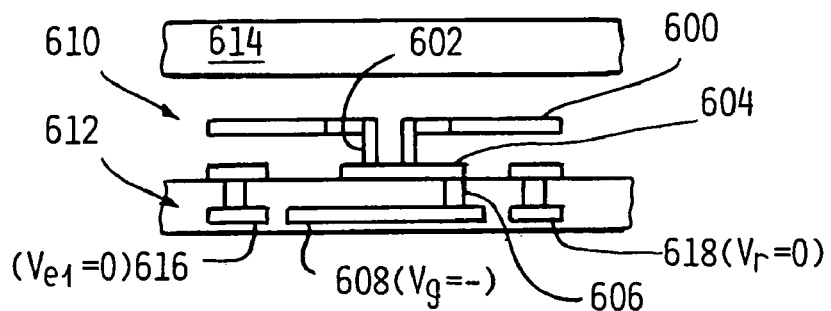
FIG. 6D is the digital micromirror of FIG. 6A in reset mode.

Once the mirror 600 is returned to the optically neutral position, the bias voltage of reset electrode 618 may be discontinued ($V_r$=0) as depicted in FIG. 6D. Bias voltage of the ground electrode 608 can continue as depicted in FIG. 6D or be discontinued as required.

The reset electrode as disclosed herein may be used with various microelectromechanical devices having deflectable member(s). The point of deflection may be a central point as discussed previously. It is also contemplated that the point of deflection may be offset depending on the design of the associated microelectromechanical device. For example, in micromirror assemblies the device may use a side hinge mount.

Figure 7A:
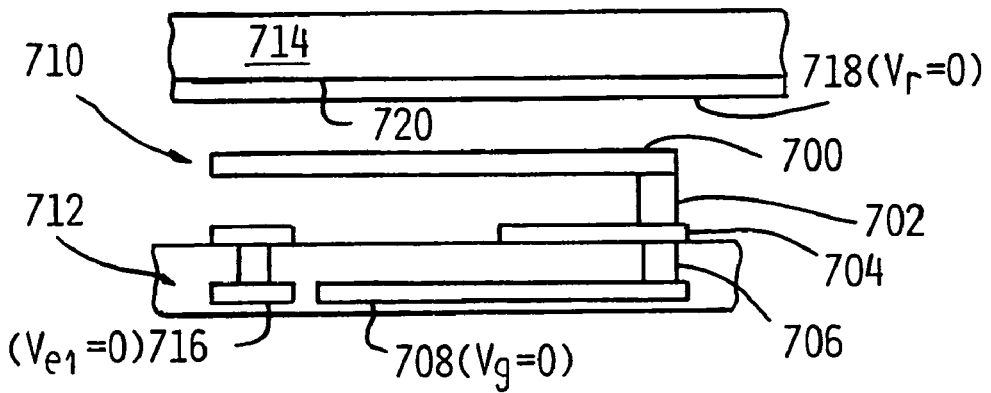
FIG. 7A is a cross-sectional view of a micromirror having a side hinge in a fourth embodiment of a micromirror array in the rest position taken at 90° to the hinge axis.
Figure 7B:
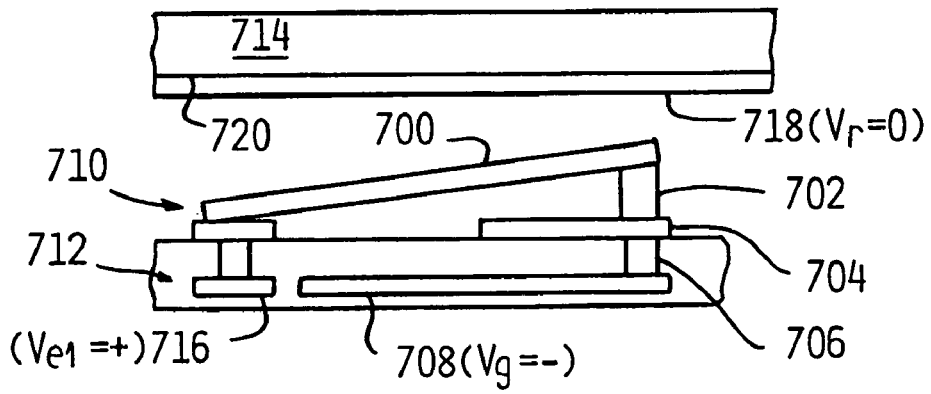
FIG. 7B is the digital micromirror of FIG. 7A driven to a deflected or operative position.
Figure 7C:
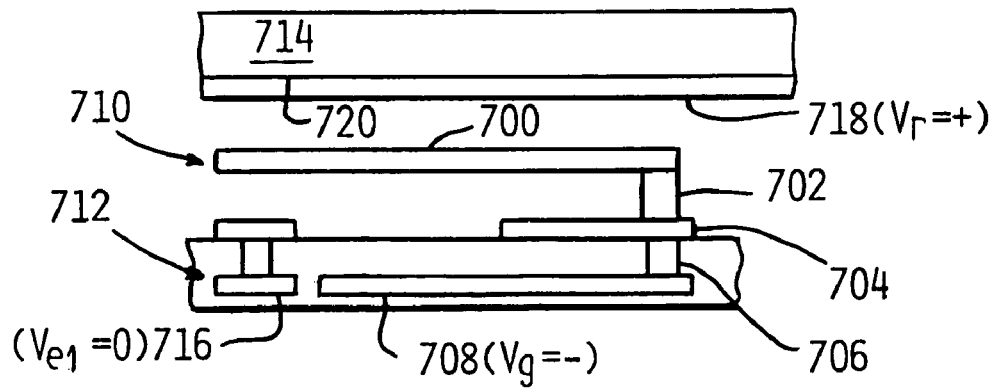
FIG. 7C is the digital micromirror of FIG. 7A in the reset mode.

A fourth alternate embodiment depicting a micromirror with a side hinge mount is illustrated in FIGS. 7A, 7B, and 7C. The micromirror is one element of a micromirror array and is depicted in cross-section at 90° to the hinge axis. Mirror 700 is attached to support post 702 by means of a suitable torsion hinge (not shown). Support post 702 is in electrical communication with ground electrode 708 via upright 706 and lower support 704. Taken together, mirror 700, support post 702, upright 706, lower support 704, and hinge(s) (not shown) form deflectable member assembly 710. Deflectable member assembly 710 is supported by substrate 712. An address electrode 716 is also supported by substrate 712. Optically transmissive substrate 714 is in spaced overlying relationship to the deflectable member 710 and substrate 712. A reset electrode 718 is supported on the lower face 720 of the optically transmissive substrate 714. The reset electrode 718 may be made of an optically transparent material as discussed previously. Reset electrode 718 may have any suitable configuration covering all or a portion of the lower face 720 of the optically transparent substrate 714 as desired or required. In the reset or optically neutral position depicted in FIG. 7A, the voltage potential of address electrode 716 ($V_{e1}$), ground electrode 708 ($V_g$), and reset electrode 718 are all zero.

In order to tilt or deflect mirror 700 into the operative position depicted in FIG. 7B a bias voltage is applied to address electrode 716 ($V_{e1}$=+). The applied bias voltage is one to produce an electrostatic force sufficient to deflect the mirror 700 and is maintained until a reset is required. In order to facilitate deflection, the electrostatic attractive force exerted on deflectable member assembly 710 can be enhanced by application of a bias voltage of the ground electrode 718 ($V_g=-$).

Reset to the rest or optically neutral position is depicted in FIG. 7C. In order to reset, a voltage potential can be established between the reset electrode 718 and the ground electrode 708. As depicted in FIG. 7C, reset electrode 718 is biased such that the bias voltage ($V_r$) is positive while the bias voltage of ground electrode 708 ($V_g$) remains negative with the absolute value being sufficient to return the micromirror 700 to the optically neutral or rest position. In order to further facilitate rapid reset, the voltage through the address electrode 716 may be reduced to zero ($V_{e1}=0$).

It is also contemplated that the reset electrode disclosed herein may be employed in configurations in which a deflectable member is supported by the optically transmissive substrate. To further illustrate this, a fifth embodiment of a micromirror device is set forth in FIGS. 8A, 8B, and 8C. A deflectable member assembly 810 is supported on optically transparent substrate 814. The optically transparent substrate 814 is in overlying relationship with a suitable semiconductor substrate 812 having suitable CMOS architecture. The deflectable member assembly 810 may move from a rest position to at least one operative position in a region defined between the semiconductor substrate 812 and the optically transparent substrate 814.

Figure 8A:
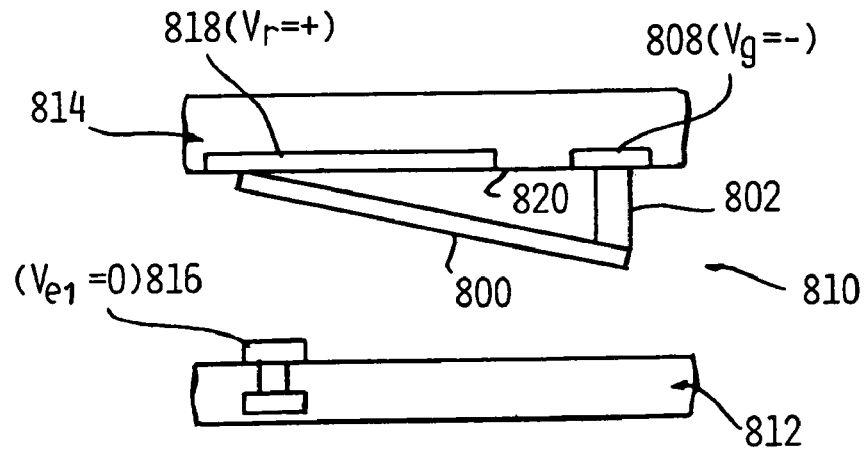
FIG. 8A is a cross-sectional view of a micromirror having a side hinge in the rest position taken at 90° to the hinge axis.
Figure 8B:
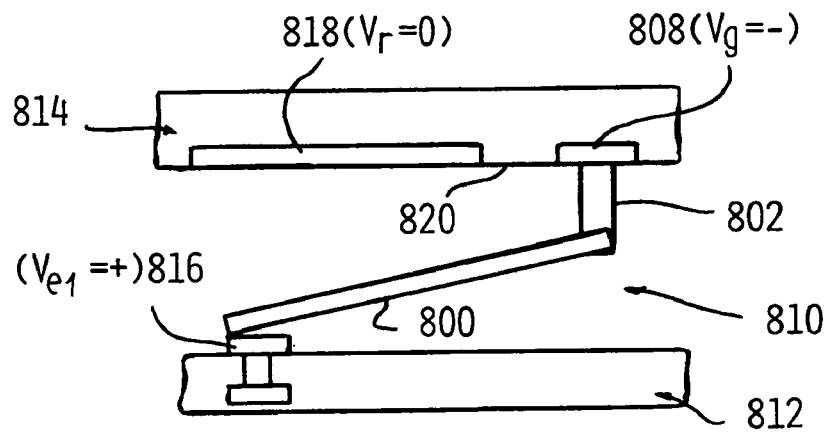
FIG. 8B is the digital micromirror of FIG. 8A driven to a deflected or operative position.
Figure 8C:
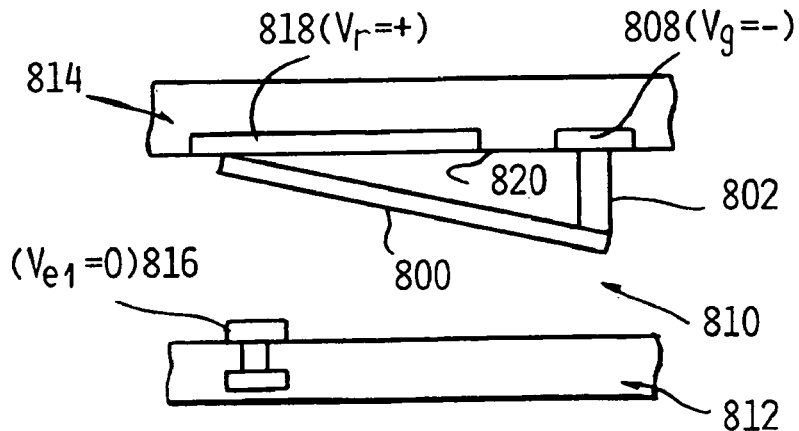
FIG. 8C is the digital micromirror of FIG. 8A in reset mode.

The deflectable member assembly 810 as depicted in FIGS. 8A, 8B and 8C includes a mirror 800 mounted on a support post 802 by means of a suitable torsion hinge (not shown). The deflectable member assembly 810 is in electrical contact with ground electrode 808. As depicted in FIGS. 8A, 8B, and 8C, ground electrode 808 is patterned on or integrated into the lower face 820 of the optically transmissive substrate 814. It is also contemplated that the ground electrode 808 could be mounted on the lower face 820 by any suitable method. A reset electrode 818 is also patterned on, integrated into, or mounted on the lower face 820 of the optically transmissive substrate 814. The reset electrode 818 is composed of optically transparent material. It is contemplated that the ground electrode 808 may be composed of any suitable material including, but not limited to, optically transmissive materials enumerated herein as would be applicable. The ground electrode 808 and reset electrode 818 function independently of one another and are both independent of the CMOS architecture found in the semiconductor substrate 812. Address electrode 816 is positioned in the semiconductor substrate 812. Typically the address electrode 816 functions within the CMOS architecture.

The deflectable member assembly 810 with mirror 800 is in a rest or optically neutral position when the voltage biases between the reset electrode 818 and ground electrode 808 are canceled. Discontinuation of the bias voltage in reset electrode 818, together with introduction of a bias voltage sufficient to generate an electrostatic attractive force at address electrode 816 drives the deflectable member assembly 810 into a tilted or operative position as illustrated in FIG. 8B. Reset to the start position can be accomplished by discontinuation of the voltage bias of the address electrode 816 together with introduction of a voltage potential in the reset electrode 818. This state is illustrated in FIG. 8C.

As depicted in FIG. 8A, in the rest or optically neutral state, the bias voltage of the reset electrode 818 ($V_r=+$) balances or cancels the bias voltage of ground electrode 808 ($V_g=-$). The absolute value of the respective bias voltage may be any suitable value. Typically, the bias voltage absolute value of ground electrode 808 and reset electrode 818 will exceed the absolute value of the bias voltage of the address electrode 816. It is contemplated that the ground electrode 808 and reset electrode 818 achieve bias voltage values between −100V and 100V.

The deflectable member assembly 810 can remain in the operative position as long as desired or required. When reset to the rest or operatively neutral position is required, reset can be accomplished by discontinuation of the bias voltage of address electrode 816 ($V_{e1}=0$) and resumption of bias voltage for reset electrode 818 ($V_r=+$) as depicted in FIG. 8C.

Location of the ground electrode 808, reset electrode 818 and associated deflectable member assembly 810 on the optically transparent substrate 814 permits standard CMOS processes (like SRAM) to be located on the semiconductor substrate 812 in the region below or covered by the deflectable member assembly 810. Integration of the microelectromechanical system such as the deflectable member assembly 810 on substrate 814 permits greater flexibility in the formation of CMOS architecture and location on semiconductor substrate 812.

The microelectromechanical device with the reset electrode as disclosed herein may be used in a variety of applications. One nonlimiting example is in spatial light modulators. It is contemplated that a spatial light modulator can include a plurality of MEMS devices as disclosed herein having micromirrors or other suitable deflectable digital light device elements arranged in a suitable array. An optically transmissive layer and a semiconductor substrate can cooperatively define a sealed chamber or cavity in which the deflectable member(s) operate. Typically, the sealed chamber or cavity can contain any suitable fluid or gaseous material for facilitating operation of the deflectable member(s). Where fluids are employed, it is contemplated that the fluid of choice will have suitable properties for enhancing function of the deflectable member, optical reflectivity, or the like. It is contemplated that various dielectric fluids in general and dielectrophoretic fluids in particular may be introduced into the sealed chamber or cavity.

The spatial light modulator is composed of an optically transmissive substrate as defined herein, a semiconductor substrate a spaced distance from the optically transmissive substrate, and deflectable member(s) positioned between the optically transmissive substrate and the semiconductor substrate. The deflectable member(s) may be appropriately configured micromirror(s) positioned between the semiconductor substrate and the optically transmissive substrate and supported by one of the foregoing. The deflectable member(s) are configured to deflect from a rest or optically neutral position to at least one operative position when electrostatically attracted to at least one address electrode located on the semiconductor substrate. The spatial light modulator also includes at least one reset electrode operable on the deflectable member to reset it to the rest or optically neutral position.

Figure 9:
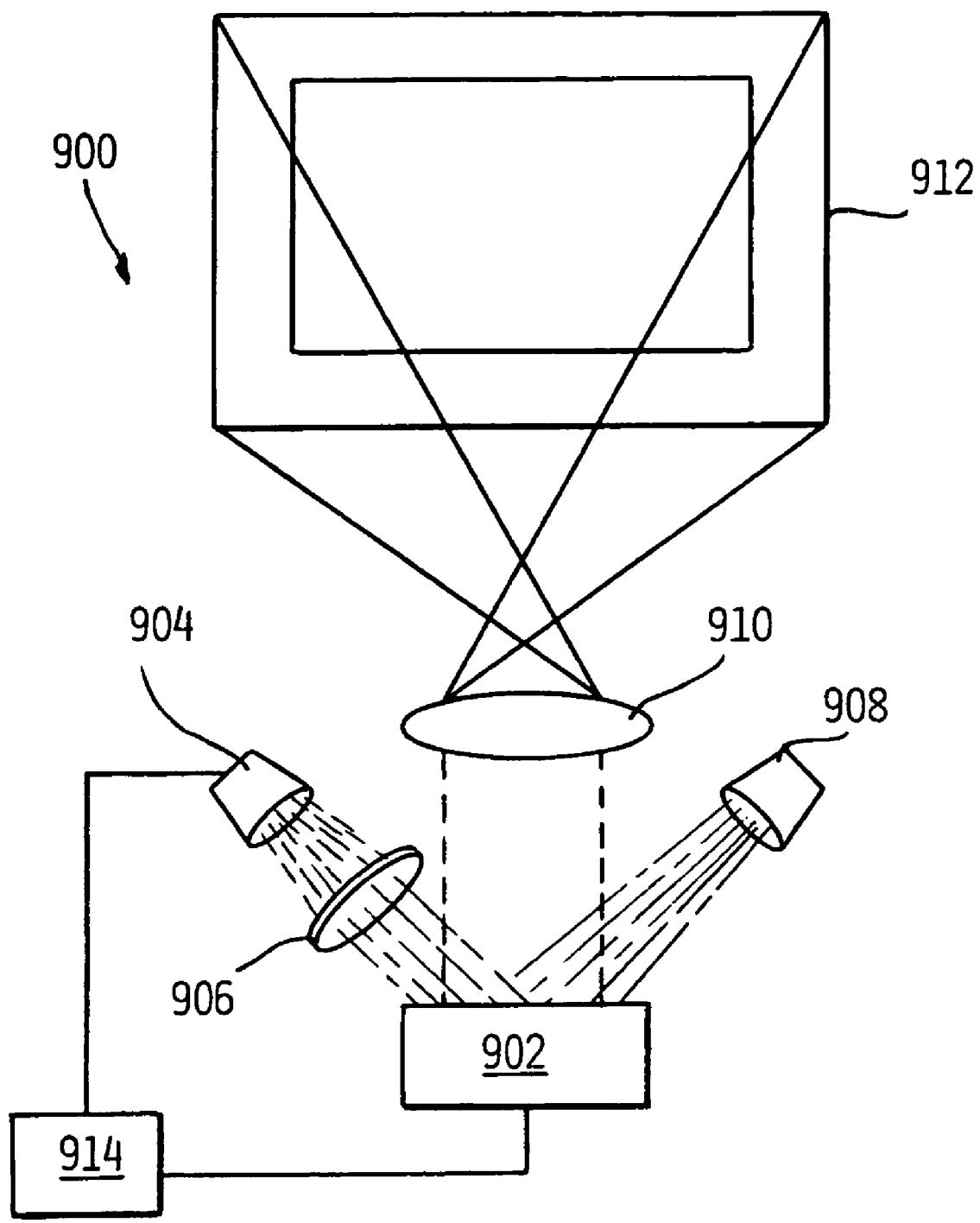
FIG. 9 is a schematic view of a display device utilizing the digital micromirror as depicted herein.

The spatial light modulator can be used with various display devices. One such device is depicted in FIG. 9. FIG. 9 is a schematic view of an image projection system 900 using an improved micromirror device as depicted herein. In FIG. 9, light from light source 904 is focused on the micromirror device 902 by lens 906. Although shown as a single lens 906, the lens 906 is typically a group of lenses, integrators, and mirrors that together focus and direct light from light source 904 onto the surface of micromirror device 902. Image data and control signals from controller 914 are written onto a suitable SRAM cell, DRAM cell, or the like, associated with each micromirror. The data in these associated cells cause some of the mirrors to rotate to an on position. Mirrors on the micromirror device 902 that are rotated to an off or rest position can reflect light into a light trap 908 or away from projection lens 910, while mirrors rotated to an on position reflect light to projection lens 910, which is also shown as a single lens for simplicity. Projection lens 910 focuses the light modulated by the micromirror device 902 onto a single image plane or screen 912.

The micromirror device 902 can be configured according to the disclosure herein and will broadly include an optically transmissive substrate, a semiconductor substrate, and at least one micromirror supported by one of the foregoing. The micromirror device 902 may also include at least one address electrode and at least one reset electrode as disclosed herein.

Figure 10:
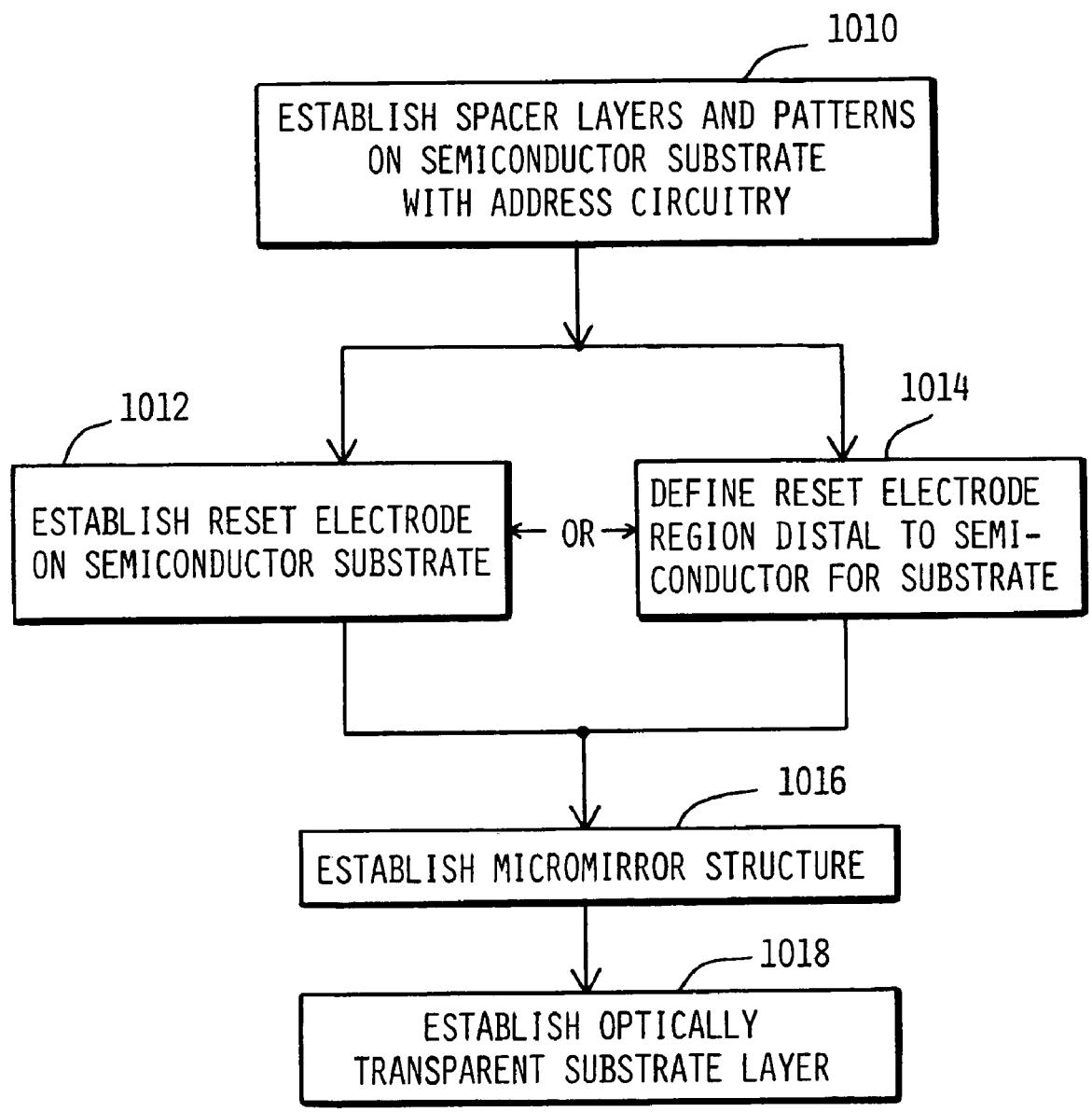
FIG. 10 is a process diagram outlining an embodiment of a method for making a micromechanical device having a reset electrode.

The device disclosed herein may be fabricated in the manner discussed herein in order to construct a microelectromechanical device with a reset electrode. Appropriate spacer layers and patterning processes can be utilized to define appropriate structure such as hinge support posts, address electrode support posts, and the like on a suitable semiconductor substrate having address circuitry defined thereon as at reference numeral 1010 in FIG. 10. Depending upon the location of the reset electrode in the finished microelectromechanical device, the semiconductor substrate can have a reset electrode already defined thereon or the reset electrode can be established on one of either the semiconductor substrate (as at reference numeral 1012) or a region distal to the semiconductor substrate as at reference numeral 1014.

In micromirror devices, it is contemplated that the various elements of the micromirror can be established sequentially through various strategies and processes. Where the reset electrode is positioned on the semiconductor substrate, it is contemplated that the reset electrode can be established as part of the same fabrication sequence. Where the reset electrode is positioned on the optically transparent substrate, it is contemplated that the process can include suitable patterning and deposition of a reset electrode region in the spacer region distal to the semiconductor substrate as at 1014. Alternately, the reset electrode can be established on the optically transmissive substrate by suitable deposition procedures including appropriate patterning and etching processes. Once the micromirror structure is established as at 1016, the optically transparent substrate layer with associated reset electrode can be established as at 1018.

In a simplified outline of a micromirror construction sequence, it is contemplated that a first spacer layer may be established, patterned, and etched to define structures such as address electrode support posts, hinge support posts and optionally one reset electrode and the like to be constructed. Hinge elements may be established in the appropriate spacer layer to connect the hinges to the hinge support posts. Similarly, address electrodes can be established on the address electrode supports.

In order to establish a mirror element, a second spacer layer may be patterned in overlying relationship to the previously defined architecture. The spacer layer can be patterned to define connections between at least one hinge element and at least one mirror element.

An optically transparent substrate may be established in sealed overlying relationship with the mirror assembly and semiconductor substrate along with appropriate removal of sacrificial layers. If not defined on the semiconductor substrate, at least one reset electrode can be established and associated with the optically transmissive substrate in a manner which permits the reset electrode to operate independent of the address electrode and, if need be, generate a bias voltage greater than the address electrode.

While embodiments have been described in connection with what is presently considered to be the most practical and preferred embodiments, it is to be understood that the invention is not limited to the disclosed embodiment(s) but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A micro-electromechanical device, comprising:
a substrate;
an optically transmissive layer disposed a spaced distance from the substrate, wherein the substrate and the optically transmissive layer define at least one cavity, the at least one cavity containing a dielectrophoretic fluid;
a support structure coupled to one of the substrate or the optically transmissive layer, the support structure contained within the at least one cavity;
a transparent conductive material positioned on the optically transmissive layer; and
a reflective element coupled to the support structure, the reflective element configured to: deflect between a rest position and at least one operative position when electrostatically attracted to an address electrode located on the substrate; and return to the rest position when subjected to an electrostatic force generated by the transparent conductive material.

2. The micro-electromechanical device of claim 1 wherein the reflective element comprises a substantially rigid reflective plate.

3. The micro-electromechanical device of claim 1 wherein the support structure further comprises a ground electrode attached to the reflective element, wherein the ground electrode is electrically coupled to the substrate and configured for selective actuation of electronic circuitry.

4. The micro-electromechanical device of claim 1 wherein the support structure comprises at least one hinge and at least one post, the at least one post connected to at least one of the optically transmissive layer or the substrate, and wherein the at least one hinge extends from the at least one post and into connection with the reflective element.

5. The micro-electromechanical device of claim 1, further comprising a voltage controller, the voltage controller operable on the address electrode and a power source connected to the transparent conductive material to actuate deflection and return to the rest position of the reflective element.

6. The micro-electromechanical device of claim 1 wherein the transparent conductive material has a voltage potential sufficient to overcome electrostatic attraction between the reflective element and the address electrode.

7. The micro-electromechanical device of claim 1 wherein the substrate includes circuitry to control the address electrode, and wherein the transparent conductive material is connected to a power source independent of the substrate circuitry.

8. The micro-electromechanical device of claim 1 wherein the transparent conductive material exhibits optical transmission greater than about 70% at a material thickness of about 200 angstroms.

* * * * *